July 26, 1932.   W. F. THOMAS   1,869,288
POWER TRANSMITTING MECHANISM IN PRIME MOVERS
Filed July 29, 1929   2 Sheets-Sheet 1
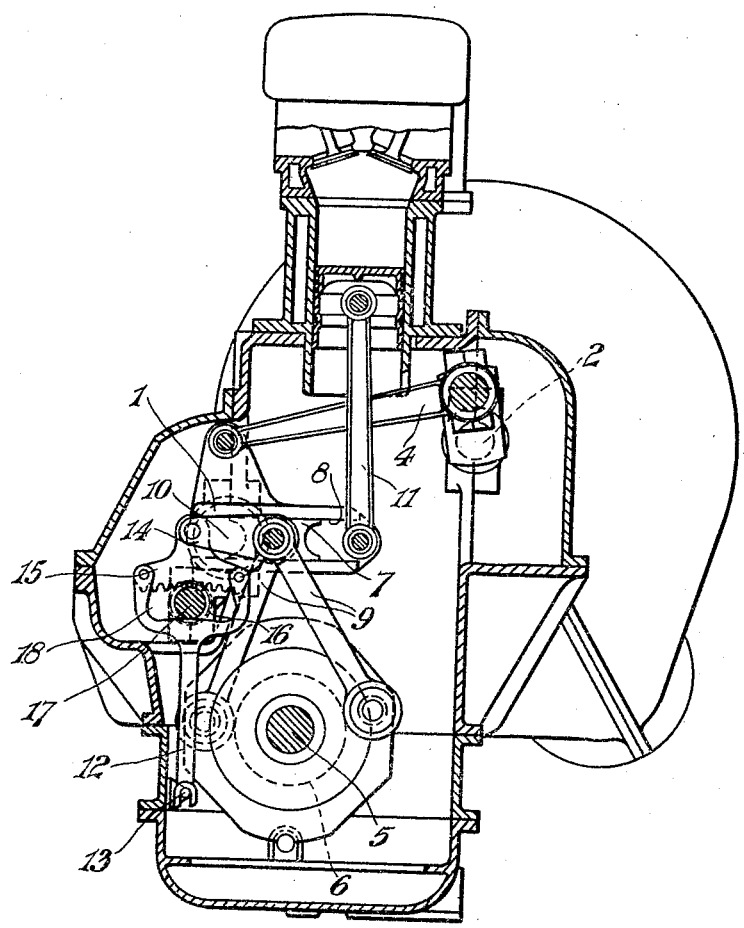
Fig.1.
Inventor
Walter F. Thomas,
by 
Attorney July 26, 1932.   W. F. THOMAS   1,869,288
POWER TRANSMITTING MECHANISM IN PRIME MOVERS
Filed July 29, 1929   2 Sheets-Sheet 2
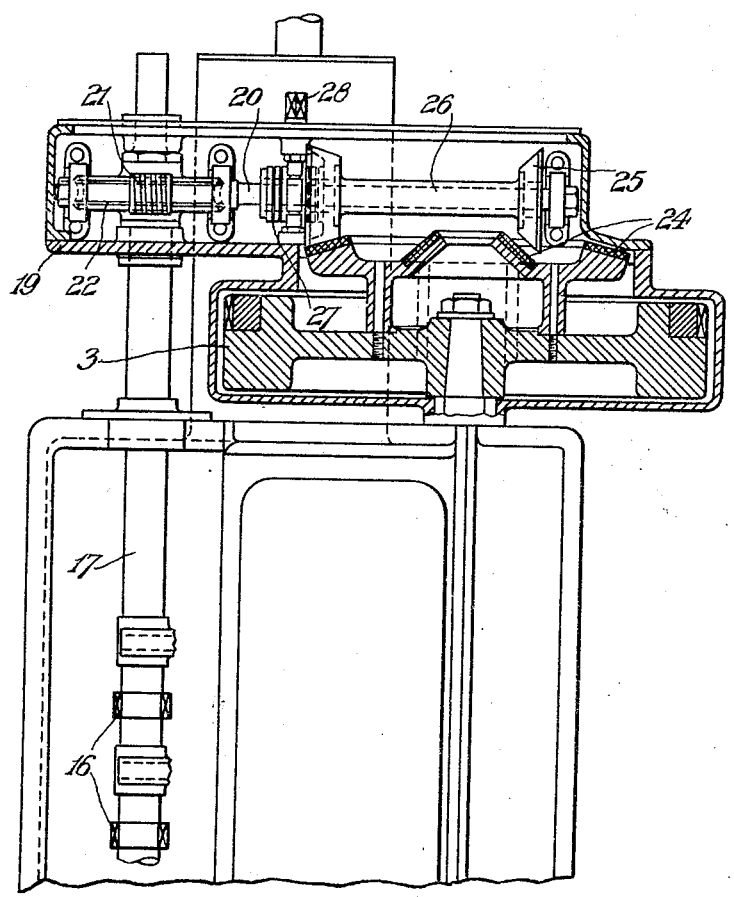
Fig. 2.
Inventor
Walter F. Thomas,
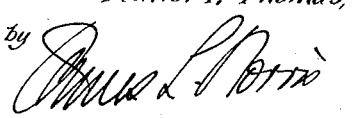
Attorney.

Patented July 26, 1932

1,869,288

UNITED STATES PATENT OFFICE

WALTER FREDERICK THOMAS, OF ST. HELENS, ISLE OF WIGHT, ENGLAND

POWER TRANSMITTING MECHANISM IN PRIME MOVERS

Application filed July 29, 1929, Serial No. 381,865, and in Great Britain August 15, 1928.

This invention relates to reciprocating engines in which the power is not taken from the crank shaft but from a separate power shaft driven through one-way clutch devices by variable throw oscillating members actuated by the engine pistons, and the object of the invention is to provide improvements in the construction and operation of such engines, more particularly in connection with the means for varying the throw of the oscillating members, so as to enable the speed ratio as between the crank shaft and power shaft to be varied.

The invention consists essentially in the employment of operating mechanism driven by the crank shaft through friction clutch devices controlled by the operator for the purpose of varying the throw of the oscillating members to obtain a desired speed ratio. By this means the operator is relieved of the necessity of applying the considerable manual effort which would otherwise be necessary to move the oscillating members to vary their throw. Moreover, by arranging that the operating mechanism is driven at a slow speed in one direction and at a relatively fast speed in the opposite direction, it is possible to provide for a slow increase of the speed ratio as the power increases and for a quick decrease of the speed ratio when it is required to decrease the power, as for example when stopping an automotive vehicle embodying the invention to avoid a collision.

In order that the invention may be more readily understood, reference will now be made to the accompanying drawings in which:—

Figure 1 is a section through the crank case and one of the cylinders of a multi-cylinder internal combustion engine constructed according to the invention and Figure 2 is a partial sectional plan of the same with one of the cover plates removed to show the operating shaft of the mechanism for varying the throw of the oscillating members.

In carrying the invention into effect as applied to a multi-cylinder internal combustion engine and as shown in the drawings, the pistons are connected each to a separate rocking lever 1 which is fulcrumed in bearings in the crank casing. The crank shaft 2 carrying a fly wheel 3 extends through the crank casing and each of the levers 1 is coupled by a connecting rod 4 to a crank on this shaft so as to maintain the pistons in step with the crank shaft and therefore with the engine valve gear and ignition apparatus (not shown) which is driven from the crank shaft in any suitable known manner.

The power is taken from a power shaft 5 which is mounted in bearings in the crank case and disposed parallel to the crank shaft, and is driven through one-way clutches 6 on the power shaft by means of blocks 7 mounted in slideways 8 on the levers 1 and connected to the one-way clutches by connecting rods 9. Each of the blocks 7 is connected to a pair of one-way clutches 6 on the shaft 5 so as to transmit power to this shaft in both directions of movement of the rocking lever, and each block 7 can be moved in its slide from a position in which it is co-axial with the fulcrum 10 of the lever to a position near the big end of the connecting rod 11 by which the piston is connected to the rocking lever.

The movement of the blocks 7 in the slideways 8 are controlled by rocking arms 12 fulcrumed in the crank case at 13 and connected by links 14 to the blocks 7, each block 7 being connected by a pair of links 14 to a single arm 12, so arranged that the pivotal connection between the arm 12 and the links 14 is in line with the slideway in the block 8 when the piston is midway between the limits of its stroke and the arm 12 is midway between the limits of its rocking movement, this being in the position shown in the drawings.

Each of the arms 12 has a curved toothed rack 15 engaged by one of a series of toothed wheels 16 fixed on an operating shaft 17 which extends through the crank casing and is accommodated in slot-like openings 18 formed in the arms 12. The operating shaft 17 projects through the end of the crank case as shown in Figure 2 and into a gear casing 19 in which is journalled a cross shaft 20 carrying a worm 21 meshing with a worm wheel 22 on the shaft 17. The engine flywheel 3

(which is mounted on one end of the crank shaft 2) carries two concentric bevelled friction wheels 24, one of which is of considerably greater diameter than the other, and a pair of co-operating bevelled friction wheels 25 fixed together by a sleeve 26 are slidably but non-rotatably mounted on the cross-shaft 20 in such a manner that either of the wheels 25 can be brought into frictional engagement with the corresponding wheel 24 so as to drive the shaft 20 in either direction, its speed in one direction being greater than its speed in the opposite direction. The arrangement of the friction wheels and associated gearing is such that the shaft 20 is driven at the greater speed when its direction of rotation is such as to cause the blocks 7 to move towards the fulcra 10.

The sleeve 26 and wheels 25 are controlled by a yoke 27 mounted on a rock shaft 28 which may be connected to a foot or hand lever or otherwise controlled, so as to enable either of the friction wheels 24 to be brought into engagement with the corresponding wheel 25, an intermediate position being also provided in which neither of the friction wheels 24 is engaged.

In operation, when the parts are in the positions shown in Figure 1, the rocking motion of the levers 1 is transmitted through the connecting rods 9 to the one-way clutches 6 so that the power shaft 5 is rotated, the speed ratio between the power shaft and the crank shaft 2 being determined by the throw of the blocks 7.

The block 7 shown in Figure 1 is about mid-way between its extreme positions. By operating the rock shaft 28 one or other of the friction wheels 24 can be brought into engagement with the corresponding wheel 25 so as to move the blocks 7 towards the fulcra of the rocking levers 1 or towards the free ends thereof. In the first case the speed ratio between the power and crank shafts will be diminished until when the blocks are coaxial with the fulcra of the rocking arms, no motion will be transmitted to the connecting rods 9 and the pistons and crank shaft will then run freely without transmitting any motion to the power shaft. On the other hand, if the blocks 7 are moved towards the free ends of the rocking levers, the speed ratio between the driving shaft and the crank shaft will be increased and will reach a maximum when the blocks 7 reach the limit of their movement.

During the movement of the blocks 7 towards the free ends of the rocking levers, the cross-shaft 20 will be driven by the wheels 24 and 25 at the slower speed so as to increase the speed ratio gradually as necessary in order that the load may be accelerated. On the other hand, when the blocks 7 are being moved towards the fulcra of the rocking levers, the cross-shaft 20 will be driven at the faster speed so as to enable the blocks 7 to be brought quickly to the fulcra of the levers 1 for the purpose of discontinuing the drive to the power shaft. When both sets of friction wheels 24 and 25 are disengaged, the worm and worm wheel 21 and 22 will hold the operating shaft 17 in adjusted position and so maintain the desired speed ratio between the power and crank shafts until the rock shaft 28 is again operated to effect a change in the speed ratio. It will be noticed that the rocking lever 1 has a relatively short arc of movement so that it is possible to keep the connecting rod 11 nearly in line with the axis of the piston at all times. As shown in the drawings the connecting rod 11 is in axial alignment with the piston when the rocking lever 1 is midway between its extreme positions so that the connecting rod swings equally or nearly equally on both sides of the axis of the piston. By this arrangement the transverse components of the forces acting on the piston and tending to press the piston against the cylinder wall are minimized.

When the engine is applied to a road vehicle, it will usually be necessary to provide for reversing the drive to the road wheels, and this may be done by means of an epicycloidal or other reversing gear of any suitable known kind. It is also preferred to connect the power shaft to the crank shaft through a one-way or free wheel drive, so arranged that if the power shaft over-runs the crank shaft at the maximum speed ratio (for example when the vehicle is running downhill) the free wheel drive will come into operation and enable the engine to act as a brake to check the motion of the vehicle. The driving mechanism described herein will also act to prevent the vehicle from running backwards downhill since no backward rotation of the power shaft 5 is possible when the block 7 is adjusted to the position in which no motion is transmitted from the engine to the driving shaft.

I claim:

1. In an engine, reciprocating pistons, a crank shaft operatively connected to said pistons, a separate power shaft, one way clutch devices for driving said power shaft, variable throw oscillating members connected to and actuated by said pistons and connected to and actuating said clutch devices, and means for varying the throw of said oscillating members, comprising means including friction clutch devices connected to and driven by said crank shaft for actuating said last named means, and means for engaging and disengaging said friction clutch devices.

2. An engine according to claim 1 wherein the means for varying the throw of the oscillating members includes a train of gearing operative to decrease the throw of said oscillating members and a second train of gearing operative to increase the throw of said oscillating members, said first train of gearing having a higher speed ratio of driven to driving elements than said last train of gearing.

3. In a reciprocating engine, reciprocating pistons; a crank shaft operatively connected to said pistons; a separate power shaft; one way clutch devices for driving said power shaft; variable throw oscillating members connected to and actuated by said engine pistons and connected to and actuating said one way clutch devices; rocking levers connected to said oscillating members for varying the throw of the latter; and means for actuating said rocking levers, said means comprising racks and pinions connected to and associated with said rocking levers, an operating shaft connected to and rotating said pinions, and means between said crank shaft and said operating shaft for rotating said operating shaft in either direction, said last named means comprising two pairs of friction wheels, one pair being operative when engaged to rotate said operating shaft in one direction and the other pair being operative when engaged to rotate said operating shaft in the opposite direction, and means for selectively engaging either of said pairs of friction wheels.

4. An engine according to claim 3 wherein the means between the crank shaft and the operating shaft for rotating the operating shaft in either direction includes a worm wheel fixed to the operating shaft and a worm meshing with said worm wheel and having means connecting it to be driven by one or the other of the pairs of friction wheels.

5. An engine including reciprocating pistons, a crank shaft, a fly-wheel thereon, a power shaft, connections between said pistons and said crank shaft for rotating the fly-wheel at a high speed, connections between said pistons and said power shaft for rotating the power shaft at variable speeds, and means operable by the crank shaft for varying the speed at which said power shaft is driven with respect to the speed of the crank shaft and fly-wheel.

6. An engine including reciprocating pistons, a crank shaft, a fly-wheel thereon, a power shaft, connections between said pistons and said crank shaft for rotating the fly-wheel at a high speed, connections between said pistons and said power shaft for rotating the power shaft at variable speeds, means operable by the crank shaft for varying the speed at which said power shaft is driven with respect to the speed of the crank shaft and fly-wheel, and means for decreasing the speed ratio of the power shaft to the crank shaft and fly-wheel at a greater speed by the last said means than for increasing said ratio.

In witness whereof I affix my signature.

WALTER FREDERICK THOMAS.